United States Patent
Minorics

(10) Patent No.: US 11,217,099 B2
(45) Date of Patent: Jan. 4, 2022

(54) AUTONOMOUS VEHICLE OPTICAL FIBER-BASED DUAL TRAFFIC CONTROLLER

(71) Applicant: Richard T. Minorics, Easton, PA (US)

(72) Inventor: Richard T. Minorics, Easton, PA (US)

(73) Assignee: EASTON SCIENTIFIC, INC., Easton, PA (US)

( * ) Notice: Subject to any disclaimer, the term of this patent is extended or adjusted under 35 U.S.C. 154(b) by 454 days.

(21) Appl. No.: 16/350,501

(22) Filed: Nov. 26, 2018

(65) Prior Publication Data

US 2020/0168092 A1 May 28, 2020

(51) Int. Cl.
| | |
|---|---|
| *G05D 1/00* | (2006.01) |
| *G08G 1/16* | (2006.01) |
| *G05D 1/02* | (2020.01) |
| *G01S 17/48* | (2006.01) |
| *G01S 19/13* | (2010.01) |
| *G01S 17/93* | (2020.01) |
| *G08G 1/04* | (2006.01) |
| *G08G 1/01* | (2006.01) |
| *G02B 6/26* | (2006.01) |

(52) U.S. Cl.
CPC .............. *G08G 1/161* (2013.01); *G01S 17/48* (2013.01); *G01S 17/93* (2013.01); *G01S 19/13* (2013.01); *G02B 6/262* (2013.01); *G05D 1/0088* (2013.01); *G05D 1/0214* (2013.01); *G05D 1/0278* (2013.01); *G08G 1/0112* (2013.01); *G08G 1/04* (2013.01); *G08G 1/166* (2013.01); *G08G 1/167* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,859,026 | A * | 8/1989 | Arents | G02B 6/06 385/116 |
| 5,384,458 | A * | 1/1995 | Hilliard | G01R 29/0885 250/227.17 |
| 5,892,867 | A * | 4/1999 | Riser | G02B 6/32 385/33 |
| 8,169,311 | B1 | 5/2012 | Breed | |
| 9,014,953 | B2 | 4/2015 | Breed et al. | |
| 9,258,058 | B2 | 2/2016 | Oshima et al. | |
| 9,335,766 | B1 | 5/2016 | Silver et al. | |
| 9,652,985 | B2 | 5/2017 | Myer | |
| 10,957,030 | B2 * | 3/2021 | Zheng | G06T 7/0004 |
| 2008/0069500 | A1 * | 3/2008 | Harness | G02B 6/262 385/59 |
| 2016/0132705 | A1 | 5/2016 | Kovarik et al. | |
| 2018/0094786 | A1 * | 4/2018 | Nguyen | F21S 11/002 |

* cited by examiner

*Primary Examiner* — James M McPherson

(57) ABSTRACT

An autonomous vehicle dual traffic controller device for detecting a second vehicle by a first vehicle, includes an outer array, the outer array having a plurality of light receiving-light transmitting lenses, the outer array positioned in an arcuate arrangement having at least one focal point and the outer array having at least two caution-colored lenses; and an inner array of optical fibers positioned inside the outer array and connecting lenses on one side of the device to lenses on the other side, the inner array positioned to receive light passing into the device through at least one lens and send that light out of the device through at least one different lens. A system to guide such vehicles is also included.

20 Claims, 14 Drawing Sheets

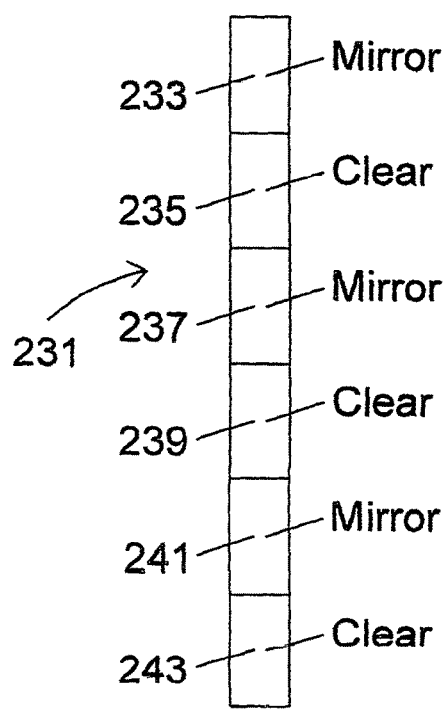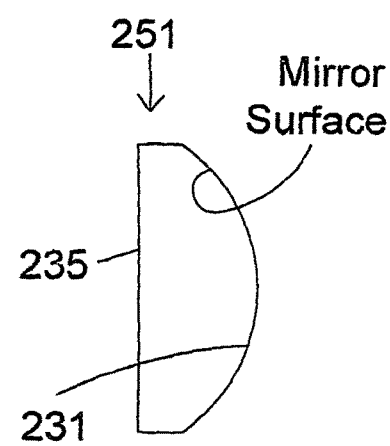
Figure 11
Figure 12

AUTONOMOUS VEHICLE OPTICAL FIBER-BASED DUAL TRAFFIC CONTROLLER

REFERENCE TO RELATED APPLICATIONS AND INCORPORATION BY REFERENCE

The present application is related to and is a continuation in part of pending United States of America patent applications, as follows: (1) U.S. Ser. No. 15/732,615 titled "AUTONOMOUS VEHICLE DUAL TRAFFIC REFLECTOR DETECTOR", filed on Dec. 4, 2017 by the same inventor herein; (2) U.S. Ser. No. 15/732,701 titled "AUTONOMOUS VEHICLE DUAL TRAFFIC REFLECTOR DETECTOR WITH INFORMATION TRANSMITTAL", filed on Dec. 18, 2017 by the same inventor herein; AND (3) U.S. Ser. No. 15/998,016 titled "AUTONOMOUS VEHICLE DUAL TRAFFIC REFLECTOR DETECTOR WITH WIRELESS TRANSMISSIONS", filed on Jun. 13, 2018 by the same inventor herein.

The same three references cited above are incorporated herein, in their entirety, by reference: (1) U.S. Ser. No. 15/732,615 titled "AUTONOMOUS VEHICLE DUAL TRAFFIC REFLECTOR DETECTOR", filed on Dec. 4, 2017 by the same inventor herein; (2) U.S. Ser. No. 15/732,701 titled "AUTONOMOUS VEHICLE DUAL TRAFFIC REFLECTOR DETECTOR WITH INFORMATION TRANSMITTAL", filed on Dec. 18, 2017 by the same inventor herein; AND (3) U.S. Ser. No. 15/998,016 titled "AUTONOMOUS VEHICLE DUAL TRAFFIC REFLECTOR DETECTOR WITH WIRELESS TRANSMISSIONS", filed on Jun. 13, 2018 by the same inventor herein.

BACKGROUND OF INVENTION a. Field of Invention

The present invention generally relates to optical fiber-based dual traffic controller devices and systems involving these devices for autonomous vehicles. The present invention devices have many applications, including ground guidance of airplanes, navigation guidance for waterways, roadway guidance and passive signaling and other advanced reflector applications. However, there is dire need for enhanced, accurate guidance systems with autonomous vehicles for lane maintenance and collision avoidance. On a macroscopic level, autonomous vehicle guidance relies upon satellite-based GPS systems that include triangulation and elevational readings. The accuracy, however, of the satellite-based GPS systems includes margins of error which sometimes result in autonomous vehicle collisions. Thus, the present invention is directed to, among other things, an accurate, ancillary guidance system that is locally positioned and locally accurate. Thus, the present invention autonomous vehicle dual traffic control devices have a plurality of lenses in an outer array and a plurality of arranged optical fibers in an inner array so that light from a first vehicle will pass into the present invention reflector device, pass through one or more optical fibers and transmit a recognizable beam of light back to a second vehicle (oncoming). This second vehicle will receive the light, such as a cautionary colored light, and with its onboard computer will determine angle and location and will make lane travel adjustments, as needed. The present invention not only includes the optical fiber-based devices, but also includes systems using these devices in conjunction with autonomous vehicle traffic flow. In some cases, the present invention devices have two sides, each one facing traffic from opposing travel directions. In other embodiments they may be designed for three way or four way or more directions of traffic and thus will have as many "sides" as there are directions of traffic. These present invention devices and systems may be advantageous to warn drivers of unseen oncoming traffic and enable the drivers to adjust-slow down, stop, pull over, change lanes, etc. Likewise, they may be useful in waterways, airways, railways and airline taxi lanes.

b. Description of Related Art

The following patents are representative of the field pertaining to the present invention:

United States Patent No. 2016/0132705 A1 to Kovarik et al describes a method and system for facilitating cost effective, reliable, system redundant, self-driving vehicles that involves the employment of specialized lane marking components that permit unprecedented sensor feedback, and in particular, a system and method that enables accurate lane marking recognition despite adverse weather conditions, which presently pose problems experienced by self-driving systems that rely upon vision based camera systems.

U.S. Pat. No. 8,169,311 B1 to Breed describes a vehicle with wireless sensors including a frame, at least one sensor assembly fixed to the frame and each including a sensor arranged to obtain data about a condition or property of the vehicle or part thereof or an environment in or around the vehicle, and a wireless transmission component coupled to the sensor for wirelessly transmitting a signal derived from the data obtained by the sensor, a receiver fixed to the frame arranged to receive signals from the wireless transmission component, and a reactive component for performing an action based on the data obtained by the sensor and transmitted from the wireless transmission component to the receiver. The data can be displayed as an indication to the driver or other occupant of the vehicle, relayed the data to a remote location for analysis or response and/or used to determine adjustment or control a component in the vehicle.

U.S. Pat. No. 9,014,953 B2 to Breed et al describes a Wireless sensing and communication system including sensors located on the vehicle, in the roadway or in the vicinity of the vehicle or roadway and which provide information which is transmitted to one or more interrogators in the vehicle by a wireless radio frequency mechanism. Power to operate a particular sensor is supplied by the interrogator or the sensor is independently connected to either a battery, generator, vehicle power source or some source of power external to the vehicle. The sensors can provide information about the vehicle and its interior or exterior environment, about individual components, systems, vehicle occupants, subsystems, or about the roadway, ambient atmosphere, travel conditions and external objects. The sensors arranged on the roadway or ancillary structures would include pressure sensors, temperature sensors, moisture content or humidity sensors, and friction sensors.

U.S. Pat. No. 9,258,058 B2 to Oshima et al describes a signal transmitting apparatus that includes a light emitter and a circuit that controls the light emitter change in luminance in frequency to transmit a signal to a receiving apparatus. The receiving apparatus includes a processor and a recording medium having a program, the program causing the processor to execute operations. The operations include obtaining first image data with a first exposure time; setting a second exposure time of the image sensor so that, in an image obtained by capturing a subject by the image sensor, a plurality of bright lines corresponding to the plurality of exposure lines included in the image sensor appear according to a change in luminance of the subject; obtaining a bright line image including the plurality of bright lines; and obtaining information by demodulating data specified by a pattern of the plurality of bright lines.

U.S. Pat. No. 9,335,766 B1 to Silver et al describes a vehicle that may distinguish between dynamic obstacles and static obstacles. Given a detector for a class of static obstacles or objects, the vehicle may receive sensor data indicative of an environment of the vehicle. When a possible object is detected in a single frame, a location of the object and a time of observation of the object may be compared to previous observations. Based on the object being observed a threshold number of times, in substantially the same location, and within some window of time, the vehicle may accurately detect the presence of the object and reduce any false detections.

U.S. Pat. No. 9,652,985 B2 to Myer describes a vehicle guidance system (VGS) that facilitates interaction between human operated vehicles (HOV), autonomous driverless vehicles (ADV), and/or semi-autonomous vehicles, on the roadway, allowing safe interface with each other and with other elements, for example, weather conditions, traffic control systems, road conditions, obstructions that enter the roadway (people, rocks, animals, debris falling onto roadway from other vehicles), etc. The system provides guidance, communication, and control for the vehicles on the roadway, by using a solar-powered system comprising post assemblies having solar panel(s), sensors, forward and/or downward lighting, and other indicators/alarms to signal to the vehicle or driver regarding road, bridge, weather, accident, speeding, or other conditions of concern in the vicinity for safety and/or operability of the vehicle/driver(s).

Notwithstanding the prior art, the present invention is neither taught nor rendered obvious thereby.

SUMMARY OF INVENTION

The present invention is directed to an autonomous vehicle optical fiber-based dual traffic controller device for detecting a second vehicle by a first vehicle that includes: a) an outer array, the outer array having a plurality of light receiving-light transmitting lens, the outer array positioned in an arcuate arrangement having at least one focal point and the outer array having at least two lenses selected from the group consisting of caution-colored lenses, colored lenses, clear lenses and combinations thereof; b) an inner array of light transmitting optical fibers positioned inside the outer array and directed toward and then away from the focal point of the at least one focal point of side outer array, the each optical fiber of the inner array being positioned to receive light passing into the device through at least one lens and to transmit the light out of the device through at least one different lens. The arcuate arrangement of the outer array is selected from the group consisting of closed loop and open loop.

In some present invention embodiments, the arcuate arrangement of the outer array is selected from the group consisting of sinusoidal, arc of fixed radius, arc of varying radius, circle and polygon.

In some present invention embodiments, there are at least four lenses, each being in a different plane from the others.

In some present invention embodiments, the optical fibers are grouped in bundles connected from a first lens to a second lens, and there are at least two bundles in the inner array, including a first bundle having optical fiber ends in a different plane from the other the optical fiber ends of a second bundle.

In some present invention embodiments, there are four to twelve bundles in the inner array, each having optical fiber ends in a different plane from the optical fiber ends of the other bundles.

In some present invention embodiments, the optical fibers include splitters with multiple optical fibers connected to a single optical fiber. In some present invention embodiments, the optical fibers are bundled and split with multiple split connected optical fibers ending at predetermined angles so as to split and transmit a single incoming light into multiple transmissions in different directions.

In some present invention embodiments, the arcuate arrangement of the outer array is circular and includes caution-colored lenses that are colored selected from the color group consisting of red, orange, yellow and combinations thereof.

In some other present invention embodiments, the present invention is a guidance system. Thus it is an autonomous vehicle optical fiber-based dual traffic controller guidance system, which includes: a) a plurality of autonomous vehicles including a first autonomous vehicle and a second autonomous vehicle, each of the plurality of autonomous vehicles having a forward projecting light (and, optionally with additional light being projected from the vehicle's side(s) and/or rear) that includes vectors of light beams directed away from a lane of travel and light receiving sensors that recognize incoming light, including angle and distance, and including computer adjustment to lane positioning (the light may be visible, invisible or both); b) a plurality of roadways having at least two lanes of travel, including a first lane for travel in a first direction and a second lane for travel in a second direction, the second direction being opposite the first direction, the roadways further including side areas outside of the first lane and the second lane; c) a plurality of autonomous vehicle dual traffic controller devices for detecting a second the autonomous vehicle by the first autonomous vehicle located along the side areas of the plurality of roadways wherein each of the devices include: (i) an outer array, the outer array having a plurality of light receiving-light transmitting lens, the outer array positioned in an arcuate arrangement having at least one focal point and the outer array having at least two lenses selected from the group consisting of caution-colored lenses, colored lenses, clear lenses and combinations thereof; (ii) an inner array of light transmitting optical fibers positioned inside the outer array and directed toward and then away from a focal point of the at least one focal point of side outer array, the each optical fiber of the inner array being positioned to receive light passing into the device through at least one lens and to transmit the light out of the device through at least one different lens; whereas when the autonomous vehicle and the second autonomous vehicle are traveling toward one another in opposite directions and a light beam from the first autonomous vehicle enters one of the autonomous vehicle dual traffic controller devices and reflects therein to be transmitted in a recognized light to the second vehicle, the second vehicle sensor relays angle and distance information to its computer to make necessary lane adjustments to avoid vehicle collision.

In some present invention system embodiments, the plurality of autonomous vehicles includes a computer that, at least in part, travels in conjunction with a satellite GPS guidance system in coordination with the autonomous vehicle dual traffic controller system.

In some present invention system embodiments, the plurality of autonomous vehicle dual traffic controller devices is located in a predetermined pattern.

In some present invention system embodiments, the arcuate arrangement is selected from the group consisting of closed loop and open loop, and further, the arcuate arrangement is selected from the group consisting of sinusoidal, arc of fixed radius, arc of varying radius, circle and polygon.

In some present invention system embodiments, there are at least four lenses, each being in a different plane from the others.

In some present invention system embodiments, the optical fibers are grouped in bundles connected from a first lens to a second lens, and there are at least two bundles in the inner array, including a first bundle having optical fiber ends in a different plane from the other the optical fiber ends of a second bundle.

In some present invention system embodiments, there are four to twelve bundles in the inner array, each having optical fiber ends in a different plane from the optical fiber ends of the other bundles.

In some present invention system embodiments, the optical fibers included splitters with multiple optical fibers connected to a single optical fiber.

In some present invention system embodiments, the optical fibers are bundled and split with multiple split connected optical fibers ending at predetermined angles so as to split and transmit a single incoming light into multiple transmissions in different directions.

In some present invention system embodiments, the arcuate arrangement of the outer array is circular and includes caution-colored lenses that are colored selected from the color group consisting of red, orange, yellow and combinations thereof.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and together with the detailed description serve to explain the principles of the invention. In the drawings:

FIGS. 11 and 12 illustrate different reflector shapes that can be used in combination with an optical fiber-based device;

Figure 15:
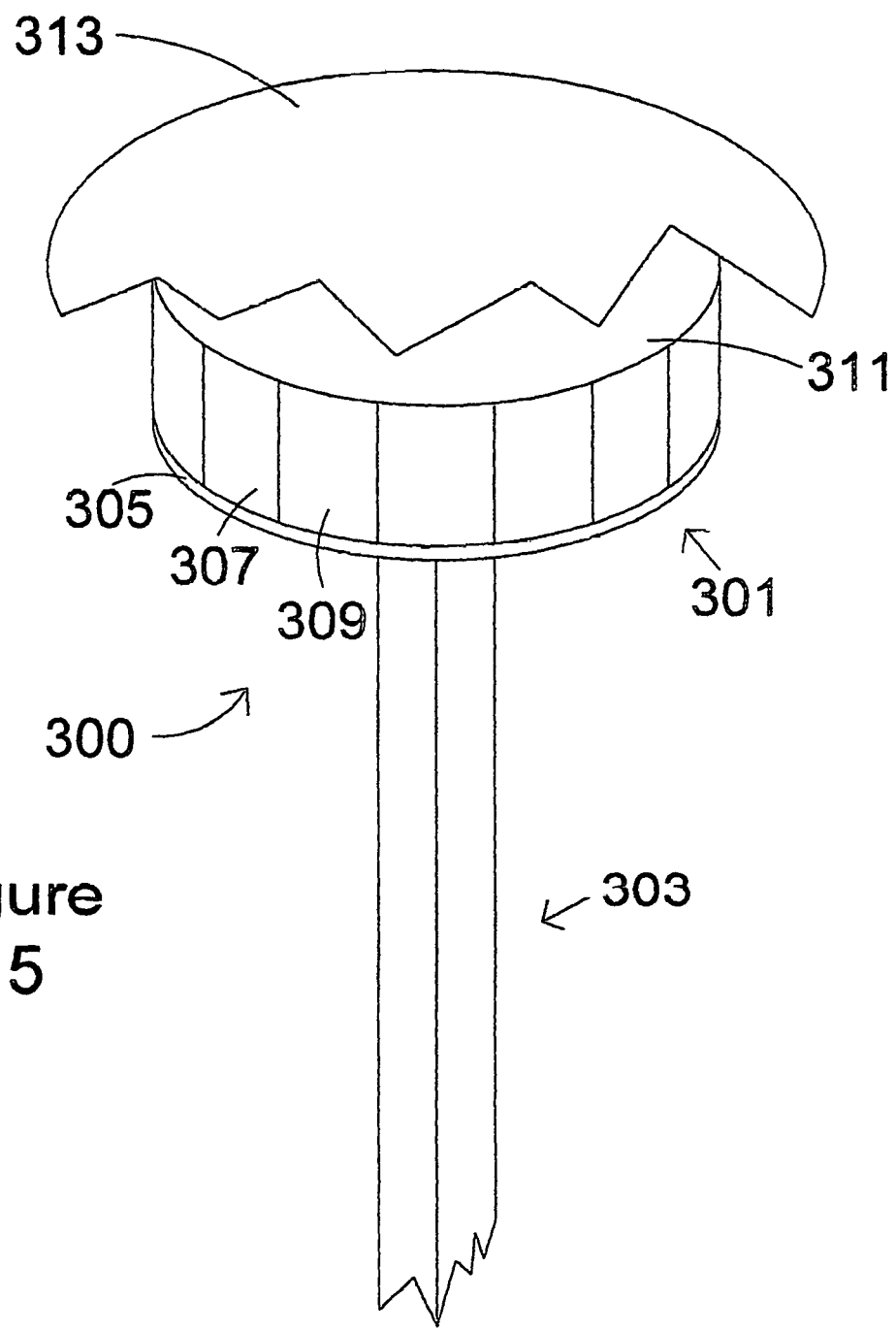
Figure 16:
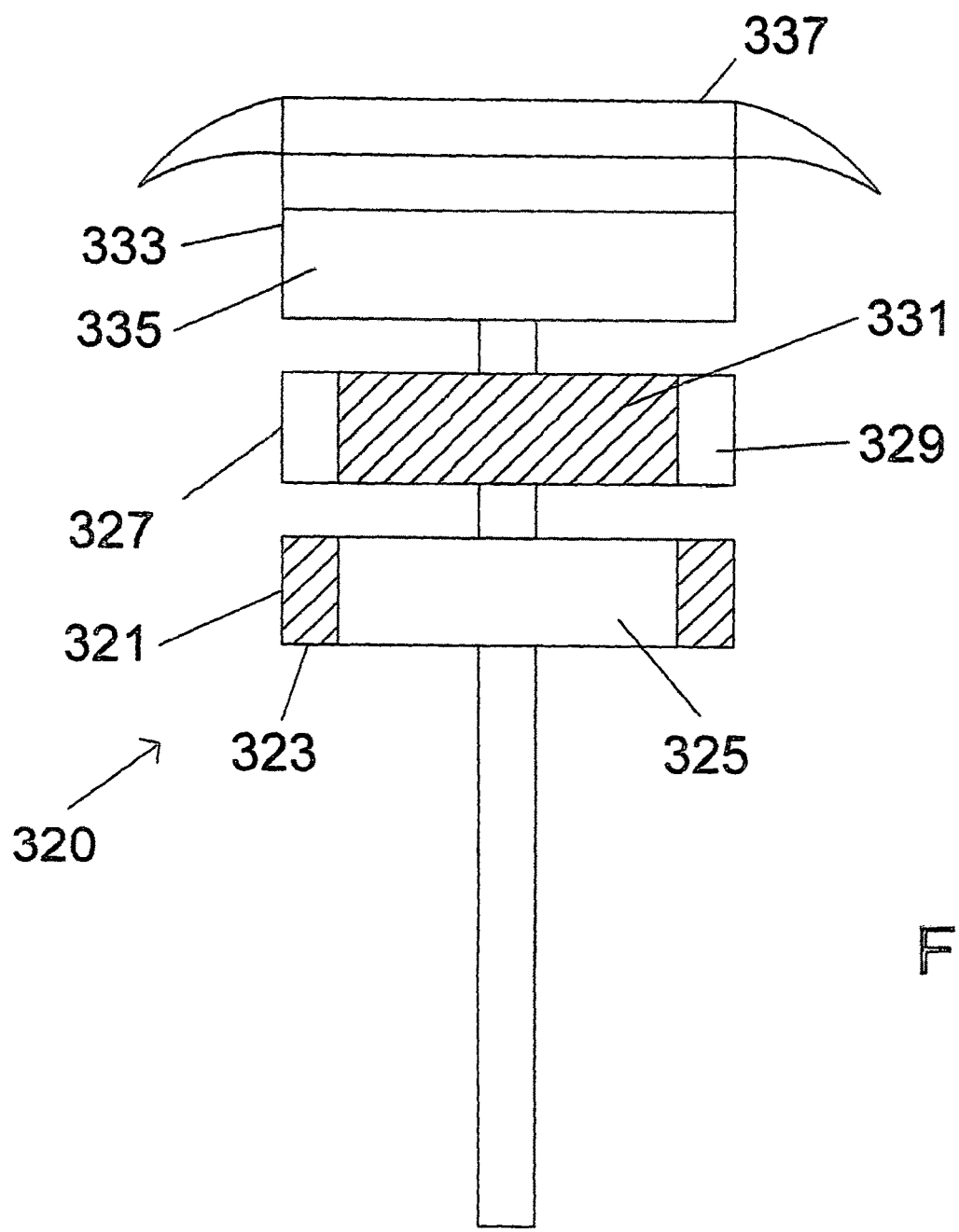

FIG. 15 shows front oblique view of a present invention optical fiber-based device with 360 degree surround rectangular lenses, to maximize use of incoming and outgoing light signals; and, FIG. 16 shows a front view of a stacked arrangement of present invention optical fiber-based devices, including diverse shielding sections, particularly useful for four way, partially or fully obscured, intersections.

DETAILED DESCRIPTION OF THE EMBODIMENTS

The present invention devices and systems are more fully understood by the following examples in conjunction with this detailed description of the drawings. The present invention autonomous vehicle dual traffic controller device has been developed for many purposes and especially for detecting a second vehicle by a first vehicle. The term "autonomous" should be broadly interpreted as used herein, and thus encompasses completely autonomous vehicles, partially autonomous vehicles, vehicles with an auto pilot type of functionality and vehicle that are at least partially or part time driven by human drivers, such as vehicles that are human driven with cruise control. The term "vehicle" as used herein should be broadly interpreted and includes, but is not limited to, single and multiple passenger vehicles, motorcycles, automobiles, trucks, buses, watercraft, such as jet skis, boats and barges, snowmobiles, off road vehicles, ground travelling planes (such as runway taxiing), and military and commercial vehicles. The term "dual traffic" as used herein means two or more than two vehicles travelling toward each other.

The autonomous vehicle dual traffic controller devices of the present invention are installed in vehicles to operate either; (1) with on-board computers that already in place for guidance and/or other systems; (2) with their own dedicated modules; or (3) a combined connected set of both of the foregoing. Thus, not all versions of the present invention devices have their own dedicated computer modules, as this is an optional feature. As with any on-board computer, some form of power is a given-battery, solar, fuel cell, other, hybrids. For simplicity, the functional computer or computer part(s) that operates, sends signal, receives signal, integrates and makes travel adjustments, shall be referred to as the guidance module, to encompass all of (1) with on-board computers that already in place for guidance and/or other systems; (2) with their own dedicated modules; or (3) a combined connected set of both of the foregoing. Thus, the first vehicle sends out a light signal (again broadly interpreted, as this light may be visible, invisible, or combinations thereof). That light signal may do two different things when it arrives at the autonomous vehicle dual traffic controller device. It is preferred that the light signal split so that part of it (1) travels to an oncoming second vehicle, if any, via the optical fibers; and part of it (2) travels back to the (sending) first vehicle by reflection off the lens to enhance its position recognition when used in conjunction with GPS or other primary location information. An oncoming second vehicle with its own guidance module, when it receives the optical fiber transmitted signal, will intake the signal, recognize its source (the present invention fixed location autonomous vehicle dual traffic controller device), enhance (fine tune) its own location when used in conjunction with GPS or other primary location information, and make travel adjusts where necessary to avoid collision or close encounters with the first vehicle.

In some embodiments, a visible colored light source, or an infrared or other invisible light source emitting from a first autonomous vehicle reflects back to that first autonomous vehicle to be noticed by the first autonomous vehicle or semi-autonomous vehicle locking in its accurate location to be signaled to a second autonomous vehicle operating more accurately to travel in a preferred safe path or road, not to be diverted, as if on a virtual rail system. In some refined embodiments, a signal sent from the first autonomous vehicle using the present invention dual traffic controller system will be based on set direction angles and thus set a predetermined distance ahead of the first semi-autonomous or autonomous vehicle, to signal oncoming traffic ahead of its approach to make accurate onboard autonomous vehicle corrections if needed, included wheel turning adjustment(s), slowing down, accelerating, or even braking and stopping completely.

The autonomous vehicle dual traffic reflector devices of the present invention are advantageously and readily utilized at night, but are also adapted for daylight use. This daytime use may be accomplished by deeply recessed lenses within the devices or may be accomplished with various shields, such as an enlarged top cap with overhang to avoid most sunlight entering the devices. Alternatively, the lenses and optical fibers may be designed and positioned for discriminating light signals in daylight with ultrasensitive accuracy. In some embodiments, the lenses could be caution-colored, colored, clear, or combinations of clear and any colored lenses. In some embodiments, the lenses include one or more areas with reflective characteristics, such as reflective, tape, reflective plastic or metal, or materials with embedded reflective flakes.

The autonomous vehicle dual traffic controller devices of the present invention, in some embodiments, have reflector lenses that may be flat or curved, and, in some cases, are compound, so that a single lens may reflect light in different directions and/or split the light so as to partially return some of the light back to its source. This may be achieved by using lenses having diverse areas such as with flat areas and with parabolic areas (for return reflection), or a lens with flat areas and reflective reverse pyramids. In addition, the optical fibers may travel to other different lenses for appropriate transmission with split or multiple fibers, and in some instances, may have some fibers return to the same lens (incoming form lens one and outgoing back through lens one) to provide the first (sending) vehicle with return info to establish its own position and distance from the device. Other means for light splitting and partial advance/partial return light transmission that are known to the artisan may be utilized in the alternative. Below Table 1, which shows some different types and Arrangements of optical fibers used in the present invention devices. Following Table 1 are various references to the drawings showing details of some Examples of present invention dual traffic controller devices and systems.

Autonomous Vehicle Optical Fiber-Based Dual Traffic Controller

Table 1 and New Claims (Revised Sep. 27, 2018) RTM-105C

TABLE 1

Possible Optical Fiber Arrangements

| Fiber arrangement | receiving light position (into controller device) | transmitting light position (out of controller device) |
| --- | --- | --- |
| (1) Single Fiber | into one lens | out of one different lens |
| (2) Single Fiber with split multiple outgoing fibers | into one lens | out of one different lens |
| (3) Single Fiber with split multiple outgoing fibers | into one lens | out of different multiple lens |
| (4) Single Fiber with split multiple outgoing fibers | into multiple lens | out of one different lens |
| (5) Multiple Fiber Bundle | into one lens | out of one different lens |
| (6) Multiple Fiber Bundle | into multiple lens | out of one different lens |
| (7) Multiple Fiber Bundle | into multiple lens | out of different multiple lens |
| (8) Plural Multiple Fiber Bundles | into one lens | out of one different lens |
| (9) Plural Multiple Fiber Bundles | into one lens | out of different multiple lens |
| (10) Plural Multiple Fiber Bundles | into multiple lens | out of one different lens |
| (11) Plural Multiple Fiber Bundles | into multiple lens | out of one different lens |

Figure 1:
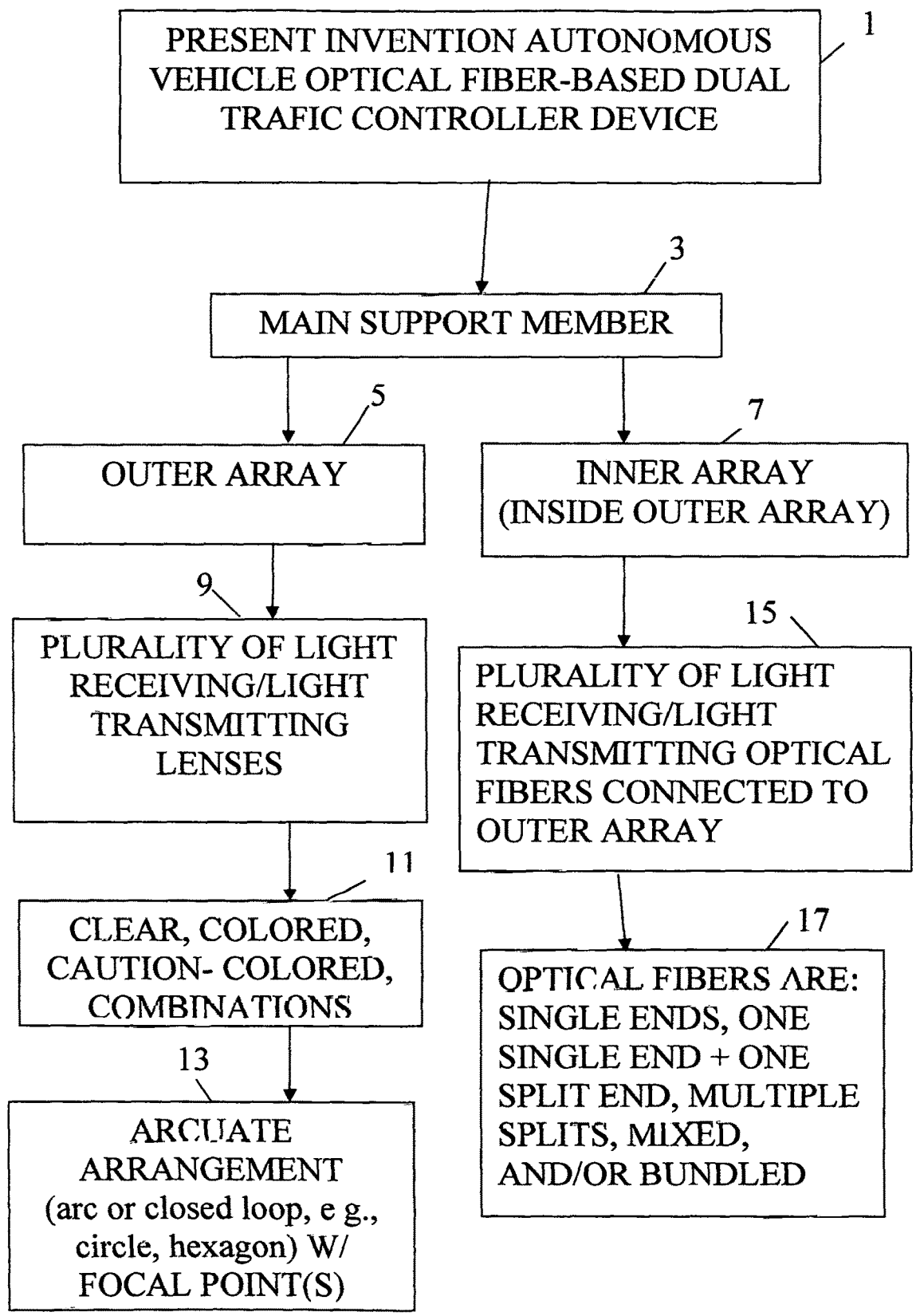
FIG. 1 shows a block diagram of various aspects of a present invention optical fiber-based device.

FIG. 1 shows a block diagram of various features of the present invention autonomous vehicle optical fiber-based dual traffic controller device 1. There is a main support member 3 for holding outer array 5 and inner array 7. Outer array 5 has a plurality of light receiving-light transmitting lenses 9, which may be clear colored, caution colored, other colors or combinations thereof. The combinations of clear and cautionary color lenses are preferred. Outer array 5 has its lenses 9 arranged in an arc or a continuous loop 13 with at least one focal point. The term "arc" as used herein should be broadly construed, such that broken or connected line segments (straight at a series of angles (like a top view of a part of a hexagon or other polygon) or curved line(s)) create a part of a loop. "Closed loop" as used herein means a continuous or continual series of parts that begin and end at the same point. Thus, a circle of parts (lenses or lenses with main support member parts between the lens) is one example of a closed loop, as would be an oval, an irregular circle, any regular or irregular polygon. Also shown in FIG. 1 is inner array 7 of optical fibers which is located inside outer array 5. This plurality of optical fibers are light receiving and light transmitting 15 and are connected to outer array lenses 9. They are positioned so as to be directed toward and away from focal point(s) 13. This allows light to pass into device 1 from one side of the device through the optical fibers, and to exit on the other side of the device to create or multiple signals, to show a series of simultaneous and/or sequential warnings from a first vehicle to a second vehicle. Also, in some instances, part of the light may travel to a second present invention device and be further dispersed and then sensed from that second device by another or other vehicle(s).

These optical fibers 17 may be single fibers (single ends, or fibers with one single end and one split end or fibers with multiple splits). They may be mixed and connected individually or they may be bundled. (For present invention purposes, an optical fiber may be split into two or more sub-strands at any point along the fiber and be included within the purview of the present invention.)

Figure 2:
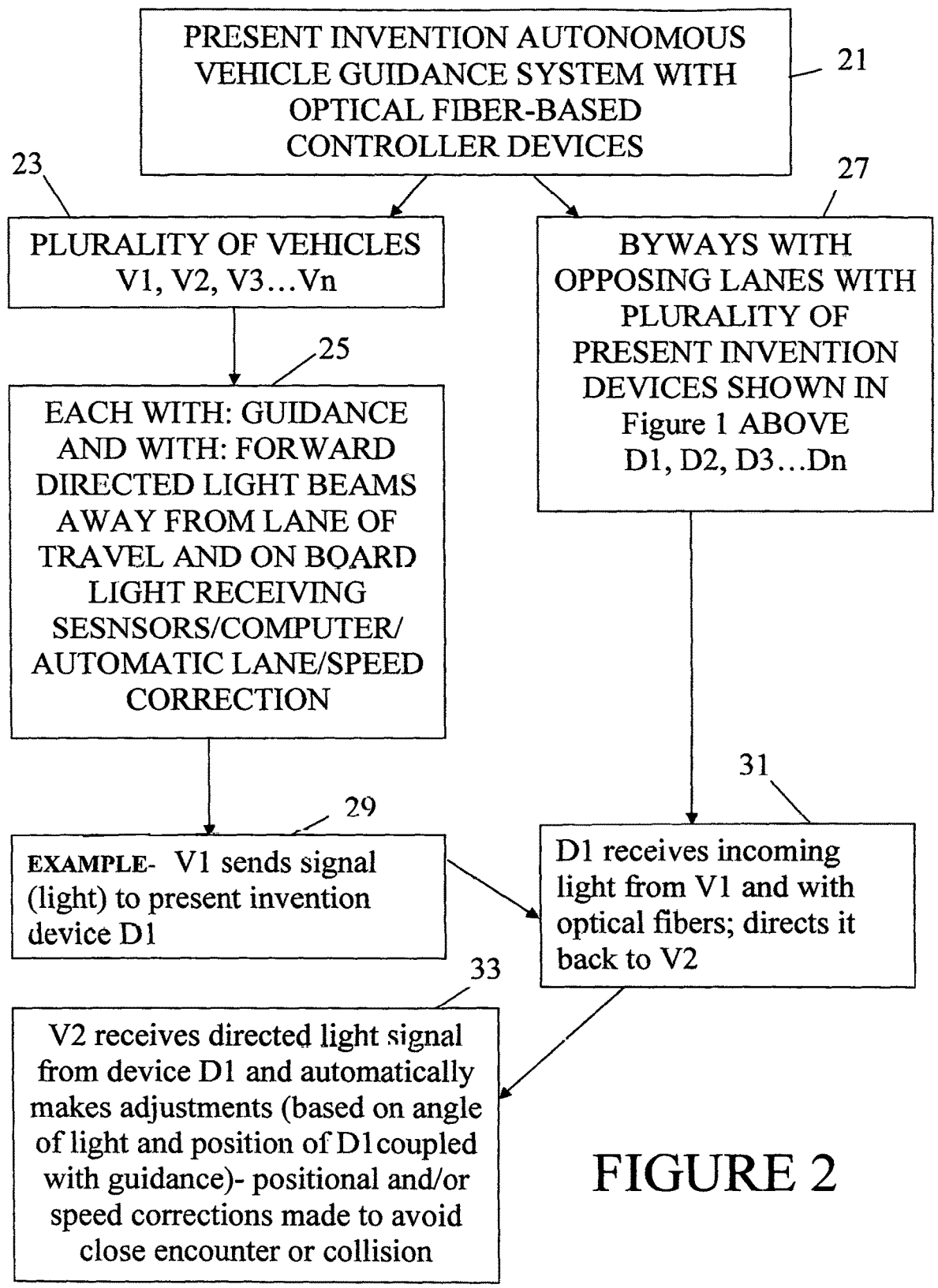
FIG. 2 shows a block diagram of various aspects of a present invention autonomous vehicle guidance system using present invention optical fiber-based devices.

FIG. 2 shows a block diagram of various aspects of a present invention autonomous vehicle guidance system 21 using present invention devices on byways 27 with a plurality of the present invention devices shown in FIG. 1. The term "autonomous" is used throughout this document and is taken to mean any vehicle that is driven by an automated system, either temporarily or permanently, with or without a (backup) person as a driver. The system 21 includes a plurality of vehicles 23 on the byways, such as V1, V2, V3 ... to Vn, where n is any number larger than 3. Each of these vehicles 23 includes guidance (as in conventional existing autonomous vehicles with GPS or similar systems), and includes light beams directed away from the lane of travel, as well as onboard light-receiving sensors, and computer control module that receives, interprets and acts upon the receive information (reflected light angle and device location) to correct the movement of the vehicle, as needed to avoid a collision or near miss, by automatic speed and lane correction 25. As an example, V1 sends a light signal 29 to device D1, which receives the incoming light from V1 and via appropriately positioned optical fibers, directs the light 31 back to V2. V2 receives that signal and automatically makes adjustment as needed 33. Not shown, but likely, is light from V2 also passes through D1 and is received by V1 for action as needed.

Figure 3:
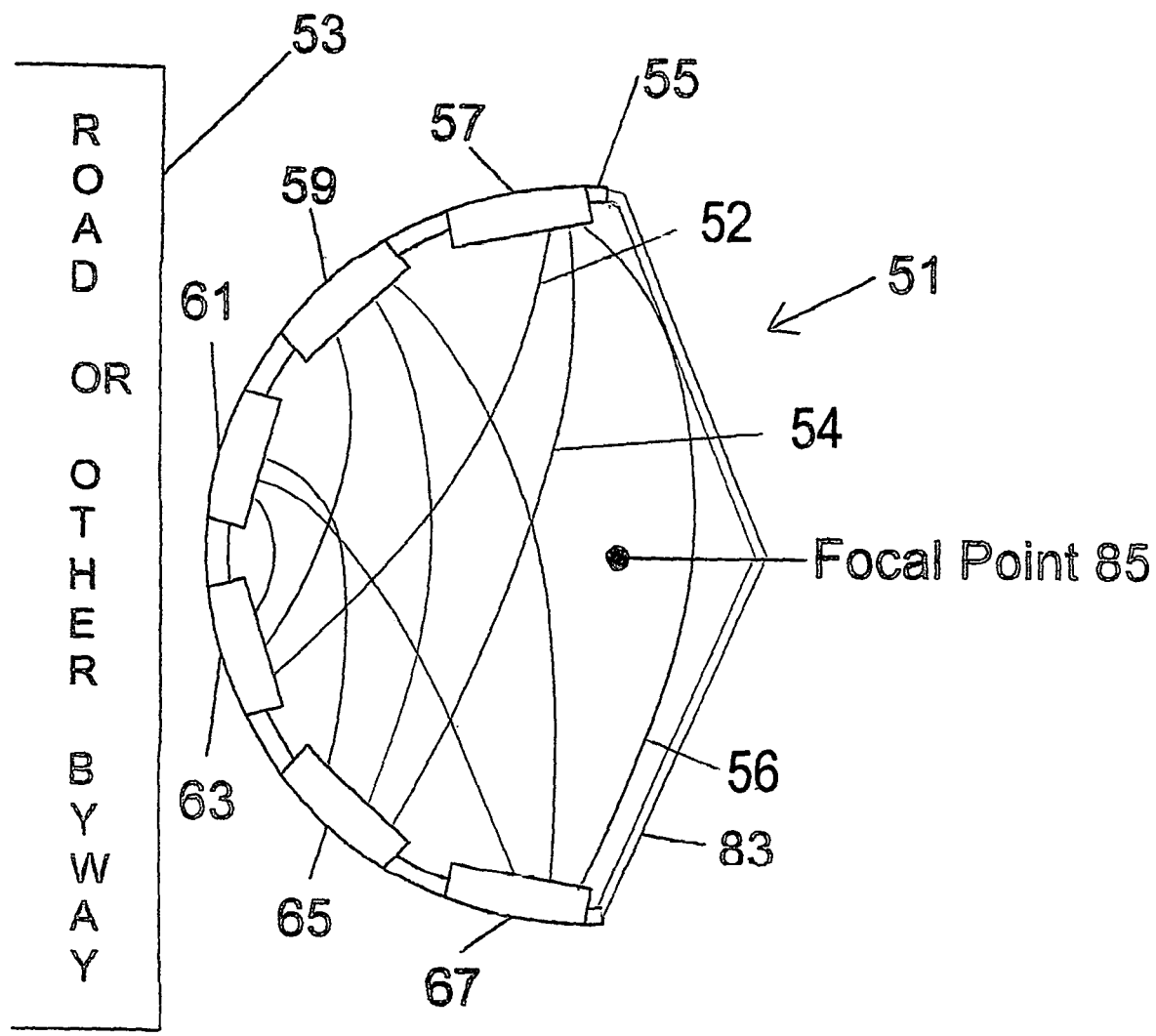
FIG. 3 shows a top view of an embodiment of a present invention optical fiber-based device having an open loop top view configuration.

FIG. 3 shows a top view of an embodiment of a present invention device having 51 an open loop top view configuration. There is a road or byway 53. "Byway" can be any surface upon which vehicles are driven, highways, streets, lanes, back roads, off road pathways, runways, plane taxiways, railways, boat channels, tunnels, military movements, etc. The present invention system is especially beneficial in tunnels and other byways where GPS systems may be blocked, such as underground garages, canopied drive-thrus, cliff overhangs, heavy overhead foliage, over/under roadways, and under bridges.

The present invention device 51 has a support structure 83 that may be a single or a multi-component support member, such as metal or plastic or rigid foam or other structure that can withstand outdoor weather, as well as combinations thereof. The structure may be mounted on a post, attached to a pole or suspended, depending upon the availability of existing sub-support members at its installed location. It would be reasonable to permanently attach it to a roadside via a post and footing, but if an existing pole or other available existing structure is present, it could be mounted to that existing structure. And, for example, if roadside overhead structures exist, suspension therefrom of present invention device is also possible. Outer array 55 is a half circle in this embodiment, and has a focal point 85. It could be half of a polygon, oval, irregular or otherwise in shape from a top view. The outer army 55 includes clear lenses and here, has no cautionary colored lenses, but additional embodiments described below do have cautionary colored lenses. The device 51 may be considered to have two functional sides.

If byway 53 is traveling north-south, then device 51 may be viewed as having a north-facing side and a south facing side, and the overall objective is to capture light coming from one side of the device 51 and transmitting it back (directing it) to the opposite side, i.e., in one side and out the other side in a deflective path via pre-arranged optical fibers connected to the lenses. In this outer array 55, the lenses are shown as lens 57, 59, 61, 63, 65 and 67. Inner array is comprised of a plurality of optical fibers that, for illustration purposes, are shown as single lines, such as fibers 52 and 54 and 56. These fibers have first ends connected to one or more lenses on a first side of the device 1 and have second ends connected to one or more lenses on the opposite second side of device 51. They are strategically positioned to receive light from oncoming vehicles on one side of the device 51 and to transmit and direct that light out of said device 51 on the other side to a second vehicle, as described above and below. In going from one side of the device 51 to the other side, all of these fibers have a layout that moves light toward, and then away from, the focal point 85. The fibers may be positioned between the outer array 55 and focal point 85, as is optical fiber 52, or may be positioned inside the outer array 55 and behind the focal point 85, as is optical fiber 56. As mentioned, for simplicity the optical fibers are shown here as single lines. However, these are illustrative and, in reality many tens of hundreds of fibers would be used and therefore larger areas of light would be received and redirected that if a single fiber were used.

Also, with many fibers per lens, it is possible to include various templates or other codes or messages on the lens for illumination and transmittal where beneficial. Thus, all of the details of the copending parent application U.S. Ser. No. 15/732,701 titled "AUTONOMOUS VEHICLE DUAL TRAFFIC REFLECTOR DETECTOR WITH INFORMATION TRANSMITTAL", filed on Dec. 18, 2017 by the same inventor herein as relating to information transmission from the lenses is repeated and incorporated into this paragraph.

Further the present invention may also include wireless communications in the devices. Thus, all of the details of the copending parent application U.S. Ser. No. 15/998,016 titled "AUTONOMOUS VEHICLE DUAL TRAFFIC REFLECTOR DETECTOR WITH WIRELESS TRANSMISSIONS", filed on Jun. 13, 2018 by the same inventor herein as relating to wireless transmissions to and from the devices is repeated and incorporated into this paragraph. Thus, wireless communications devices maybe connected to the present invention autonomous vehicle optical fiber-based dual traffic controller devices to provide for radio or other wireless communications, including: vehicle to vehicle; vehicle to satellite; satellite to vehicle; vehicle to a ground tower or station, such as cell phone towers or police, fire or medical stations. These communications set ups may also be used to locate a moving or stationary receiver, such as a police car, ambulance, fire hydrant, hospital, etc.

Figure 4:
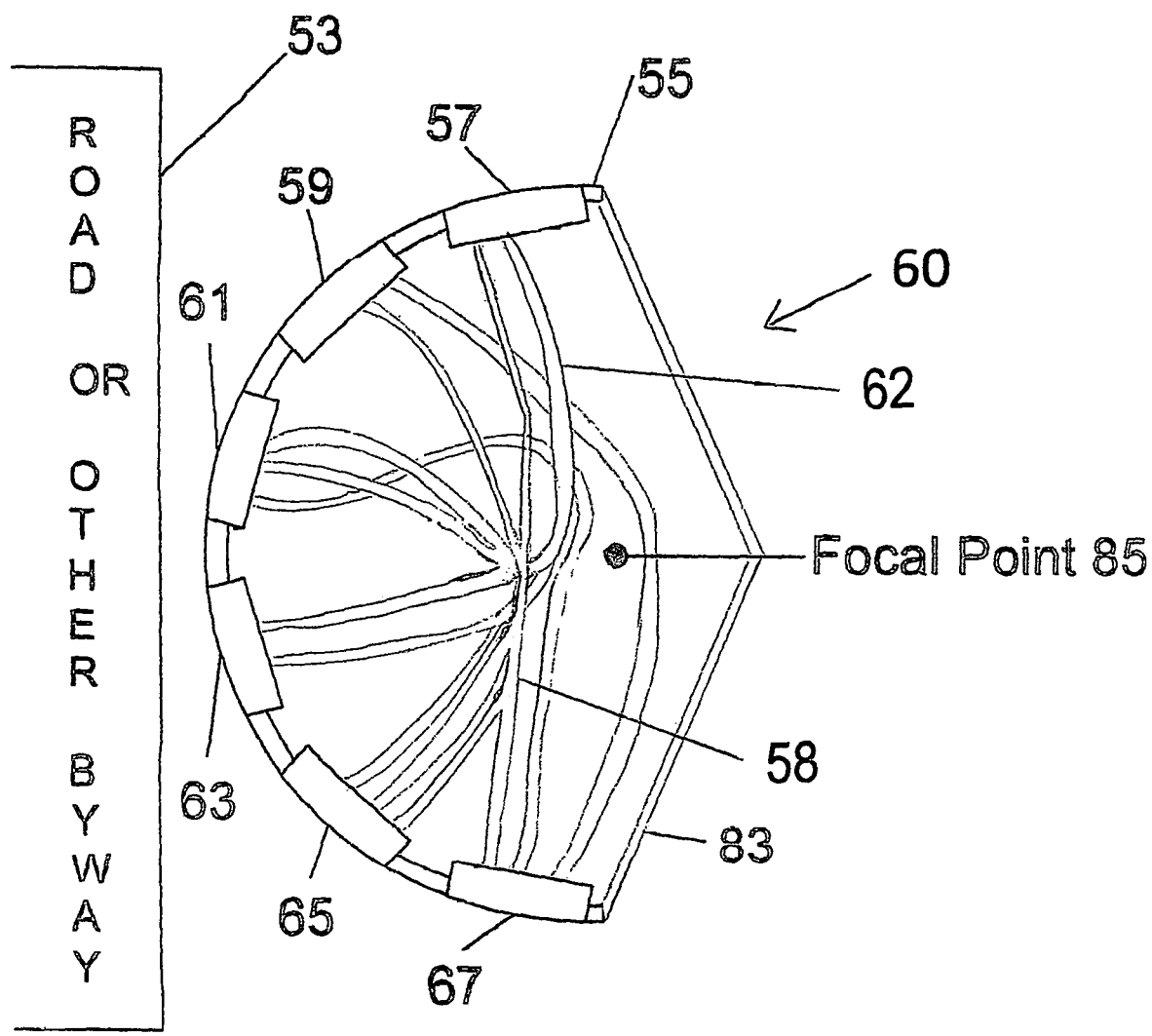
FIG. 4 shows a top view of an embodiment of a present invention optical fiber-based device having a closed loop top view configuration that includes fibers with splits for diverse light transmissions.

FIG. 4 shows a top view of an embodiment of a present invention device 60, which is similar to device 51 of FIG. 3 above, wherein identical parts are identically numbered. Here, however, are different optical fiber arrangements. They are sparse for illustration purposes, but in actual practice be significantly more abundant. The optical fibers vary and some are single ended at both ends, while others are split or have multiple splits. The advantages are less thickness in the center where they all cross each other. This furthers the use of more fiber ends at the lenses for a given volume inside the devices. Note, for example, that optical fiber 58 has splits at both ends and optical fiber 62 has splits at one end. These otherwise operate in the same manner as described for the previous Figures.

Figure 5:
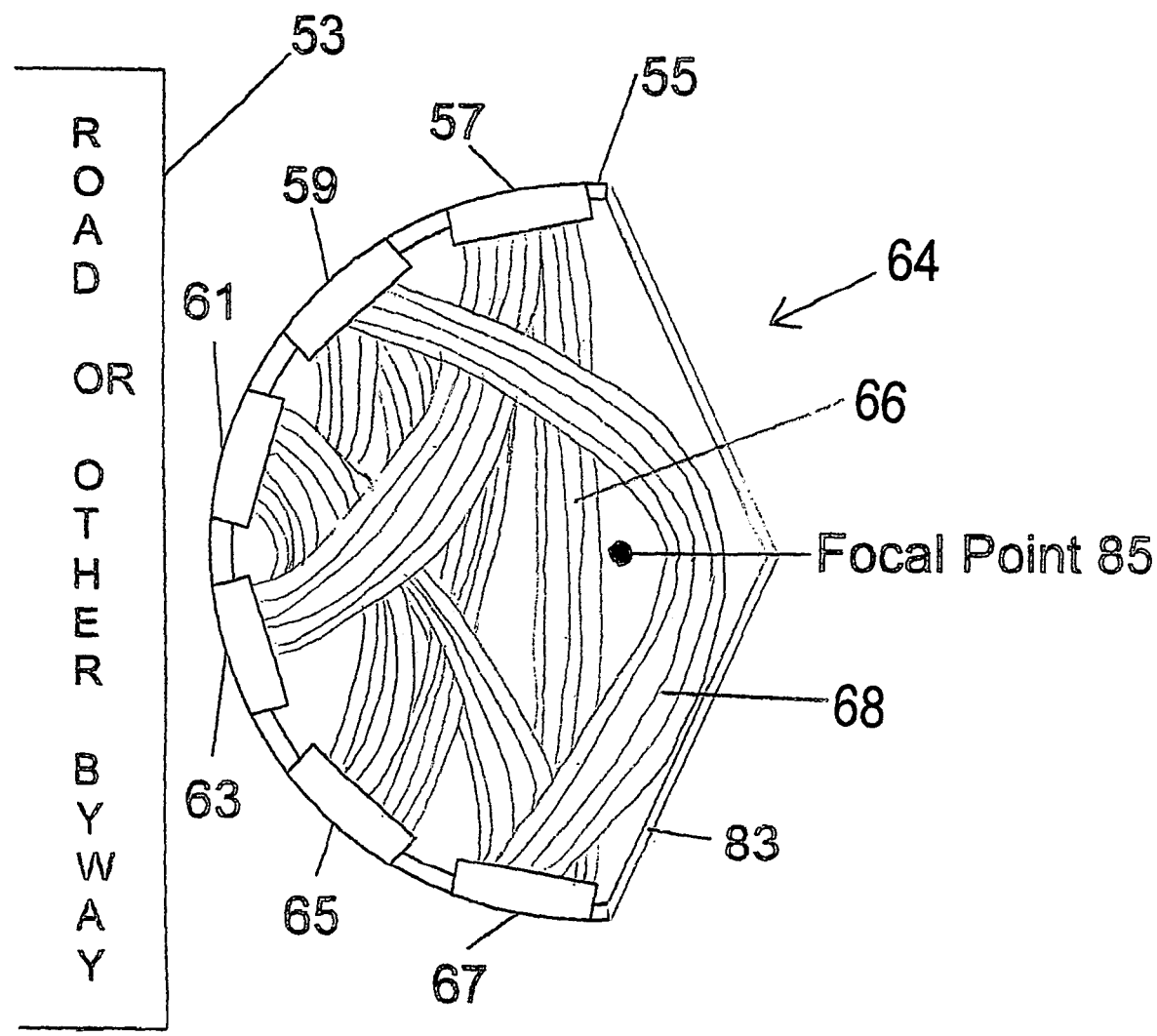
FIG. 5 shows a top view of an embodiment of a present invention optical fiber-based device having a circular top view configuration that includes optical fiber bundles.

FIG. 5 shows a top view of an embodiment of a present invention device 64, which is similar to device 51 of FIG. 3 above, wherein identical parts are identically numbered. Here, however, are different bundles of optical fiber arrangements, such as bundle 66 and bundle 68. They are sparse for illustration purposes, but in actual practice be significantly more abundant. The optical fiber bundle advantages are less thickness in the center due to compactness, where they all cross each other, and also have the advantage of consistent amounts of incoming and outgoing light for each and all of the lenses to which they are connected. Also, information images may be applied at the lenses for each bundle. These otherwise operate in the same manner as described for the previous Figures.

Figure 6:
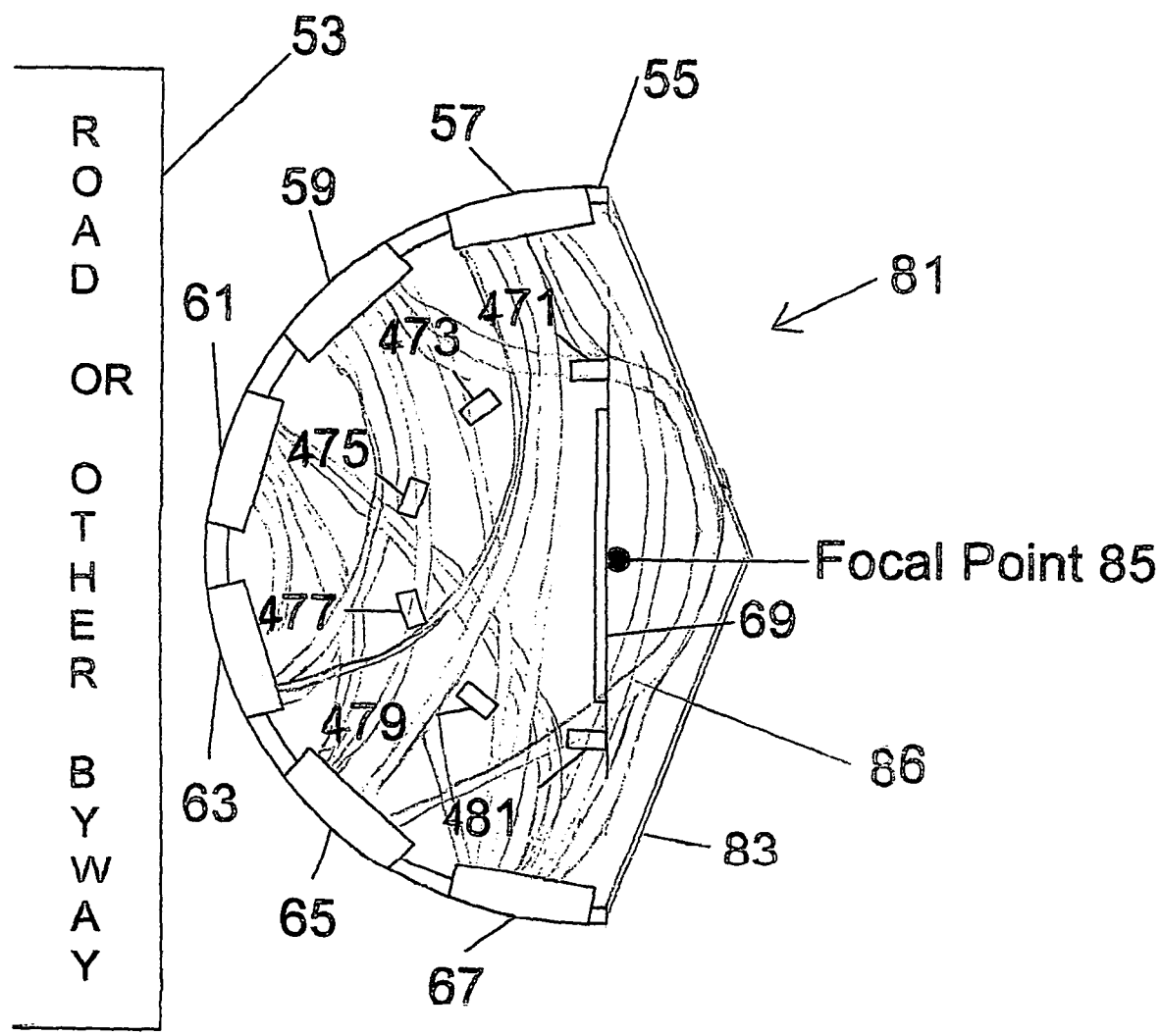
FIG. 6 shows a top view of an embodiment of a present invention optical fiber-based device having reflector mirrors in combination with optical fibers.

FIG. 6 shows a top view of an embodiment of a present invention device that combines the features of both the parent application reflector detector devices incorporated herein by reference above, and the optical fiber-based present invention devices as described in the previous Figures. Here, present invention device 81 has an open loop array, top view configuration. Some of the features in this Figure are identical to those shown and described in FIG. 3, and are thus identically numbered.

The present invention device 81 of FIG. 6 has a support structure 83 that may be a single or a multi-component support member, such as metal or plastic or rigid foam or other structure that can withstand outdoor weather, as well as combinations thereof. The structure may be mounted on a post, attached to a pole or suspended, depending upon the availability of existing sub-support members at its installed location. It would be reasonable to permanently attach it to a roadside via a post and footing, but if an existing pole or other available existing structure is present, it could be mounted to that existing structure. And, for example, if roadside overhead structures exist, suspension therefrom of present invention device is also possible. Outer array 55 is a half-circle in this embodiment, and has a focal point 85. The outer array 55 includes clear lenses and may include cautionary colored lenses. In this outer array 55, the lenses are shown as lens 57, 59, 61, 63, 65 and 67. The inner array is comprised of separated stand-up mirror reflectors 471, 473, 475, 477, 479 and 481 arranged in an arc between the outer array 55 and focal point 85. They are strategically positioned to receive light from oncoming vehicles and to reflect it to a second vehicle, as described above and below. In addition, the inner array also has numerous optical fibers running from lenses on one side to lenses on the other, such as optical fiber 86 that function as those described in the previous Figures. The big advantage to having both fibers and mirrors is that the fibers can be easily arranged and can direct incoming light of one lens and direct it out of one or two or more lenses, whereas the mirrors can be used for consolidated light transfer to transmit template and symbolic or coded information to a receiving vehicle.

Figure 7:
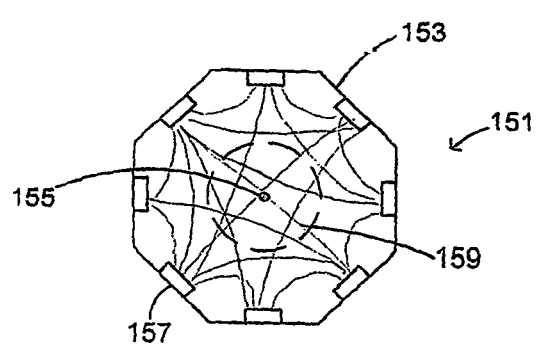
FIG. 7 shows a top view of an embodiment of a present invention optical fiber-based device having a polygonal top view configuration.

FIG. 7 shows a top view of an embodiment of a present invention device 151 having a polygonal top view configuration with an outer array 153 with a plurality of lenses such as lens 157, which may be any combination of colors/clear, as described above. The inner array 159 is inside outer array 153 and outside focal point 155. The inner array 159 may have any of the above-described optical fiber configurations, such as optical fiber 159.

Figure 8:
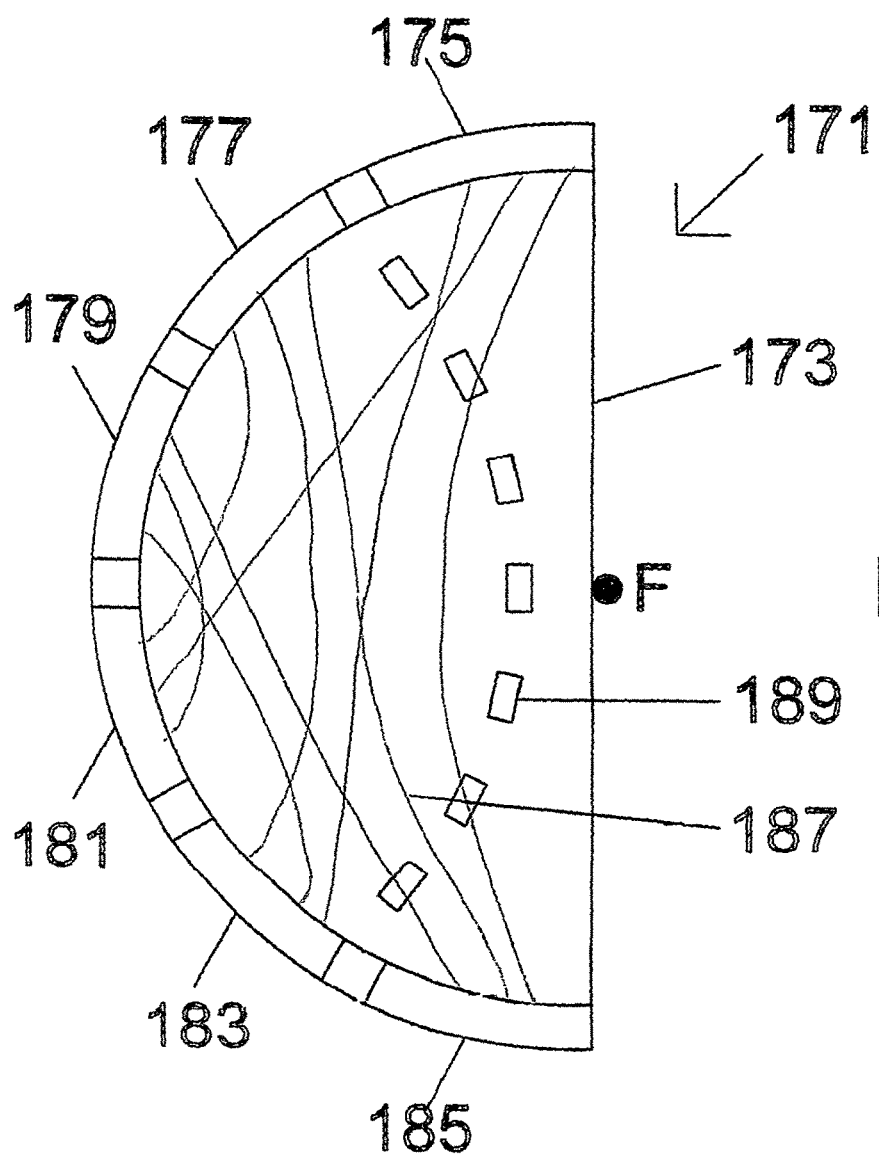
FIG. 8 shows a top view of an embodiment of a present invention optical fiber-based device having an arc of a fixed radius reflector top view configuration.

FIG. 8 shows a top view of an embodiment of a present invention device 171 that combines optical fibers and reflectors. Device 171 has an outer array 175 and an arc of a fixed radius with focal point F, and with a reverse (facing opposite direction) directed inner array arc made up of a plurality of reflective mirrors, such as mirror 189 and a significant plurality of optical fibers, such as fiber 187. The spaces between the mirrors may allow light to hit the back of support structure 173, which also may optionally be a mirrored surface. Outer array 175 has a plurality of lenses 177, 179, 181, 183 and 185.

Figure 9:
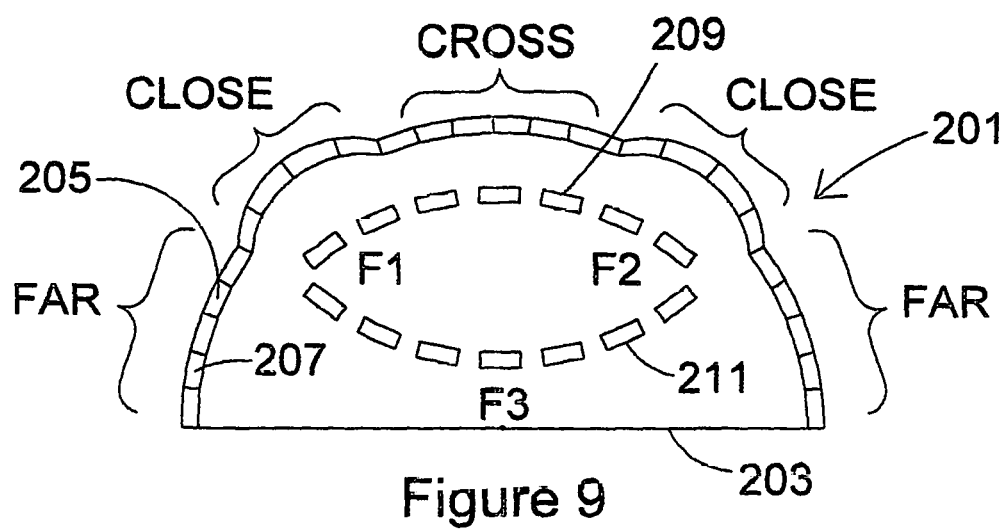
FIG. 9 shows a top view of an embodiment of a present invention reflector detector device having an arc of varying radius top view configuration.
Figure 10:
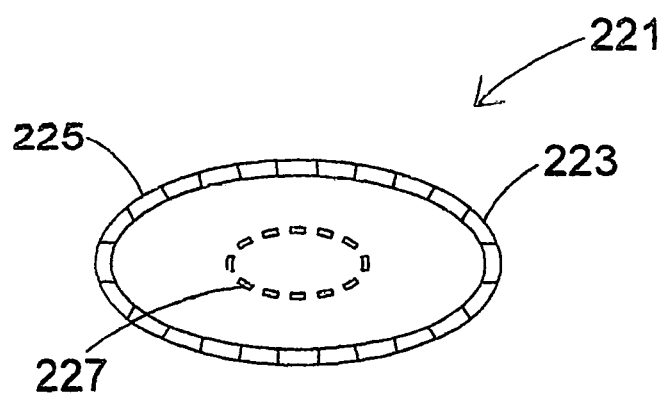
FIG. 10 shows a top view of an embodiment of a present invention reflector detector arrangement having a oval top view configuration that can be used in combination with an optical fiber-based device.

FIGS. 9 and 10 show variations on mirrored inner arrays that may be used with optical fiber combinations herein. The optical fibers are not shown in the Figures for simplicity, but may be placed above, below or among the mirrors, but preferably above and/or below them.

FIG. 9 shows a top view of an embodiment of a reflector detector device 201 with support structure 203, outer array 205 and inner array 211 with two sided mirrors such as mirror 209. In this configuration, the outer array has at least two focal points including F1, F2 and F3. Inner array 211 is positioned between focal point F3 and outer array 205. As can be seen, parts of the outer array are based on large radii (not shown) emanating from focal point F3 to receive light from relatively far distances at its sides and right angle lights at its fronts. In between are small radius arcs emanating from focal points F1 and F2 to receive light from relatively close sources. As mentioned, numerous present invention optical fiber configurations can be combined herewith.

FIG. 10 shows a top view of an embodiment of a present invention reflector detector device 221 having a oval top view configuration. It includes outer array 223 with multiple, diverse lenses such as lens 225. Inner array 227 with reflective mirrors is likewise oval in shape and may utilize any individual mirrors spacings such as described above. As mentioned, numerous present invention optical fiber configurations can be combined herewith.

FIGS. 11 and 12 illustrate different reflector shapes. In FIG. 11, a lens 231 has segments of alternating reflective and clears surfaces. Specifically, segments 233, 237 and 241 are mirrored or as segments 235, 239 and 243 are clear. FIG. 12 shows reflective mirror 221 with a flat outer surface 255 and a concave surface 253 so as to capture incoming light and reflect that incoming light from many more angles than a flat surface might successfully reflect from a first vehicle to another vehicle.

Figure 13:
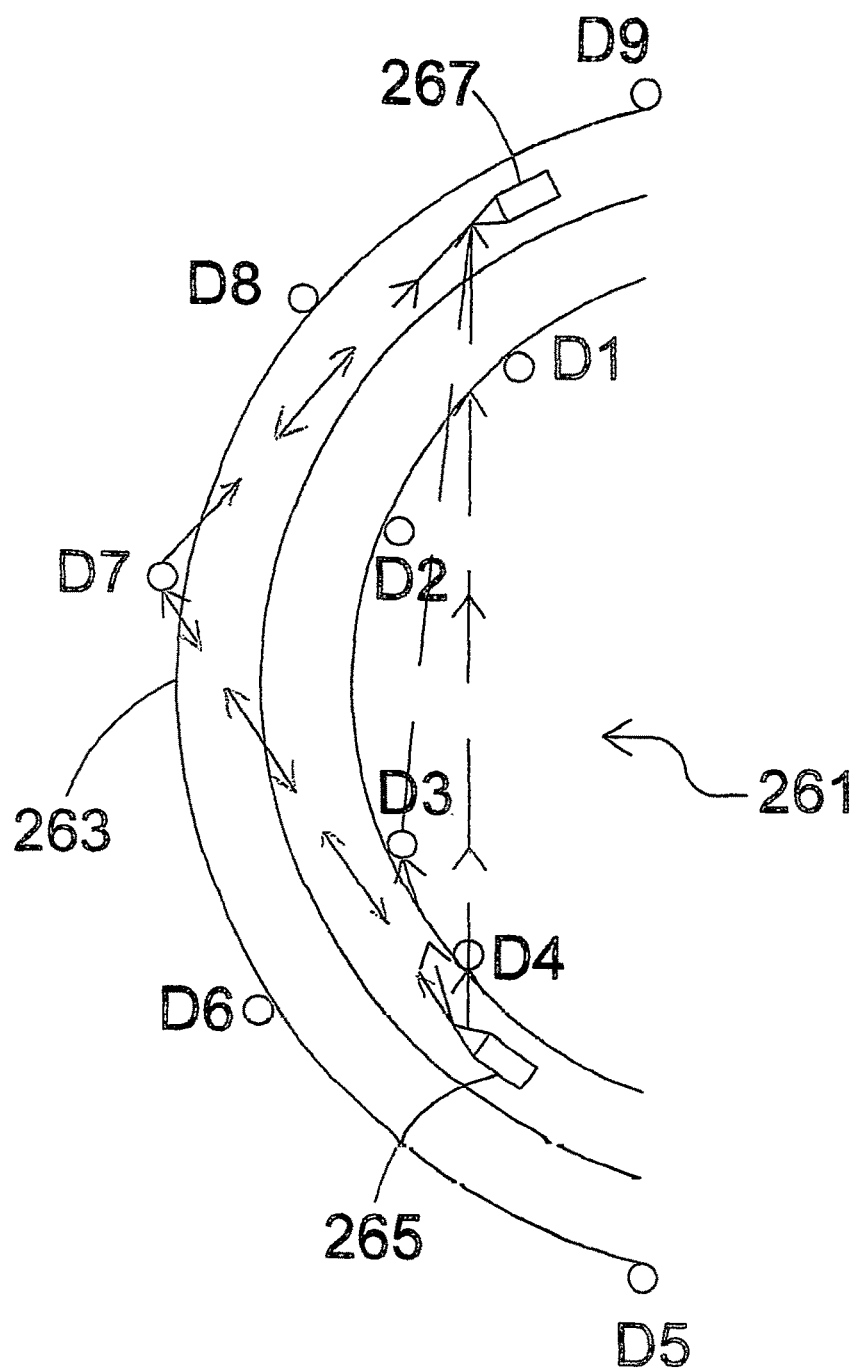
FIGS. 13 and 14 show top views of a system with different scenarios of opposing autonomous vehicles approaching one another with present invention that can be used in combination with an optical fiber-based device for assisting in travel guidance.
Figure 14:
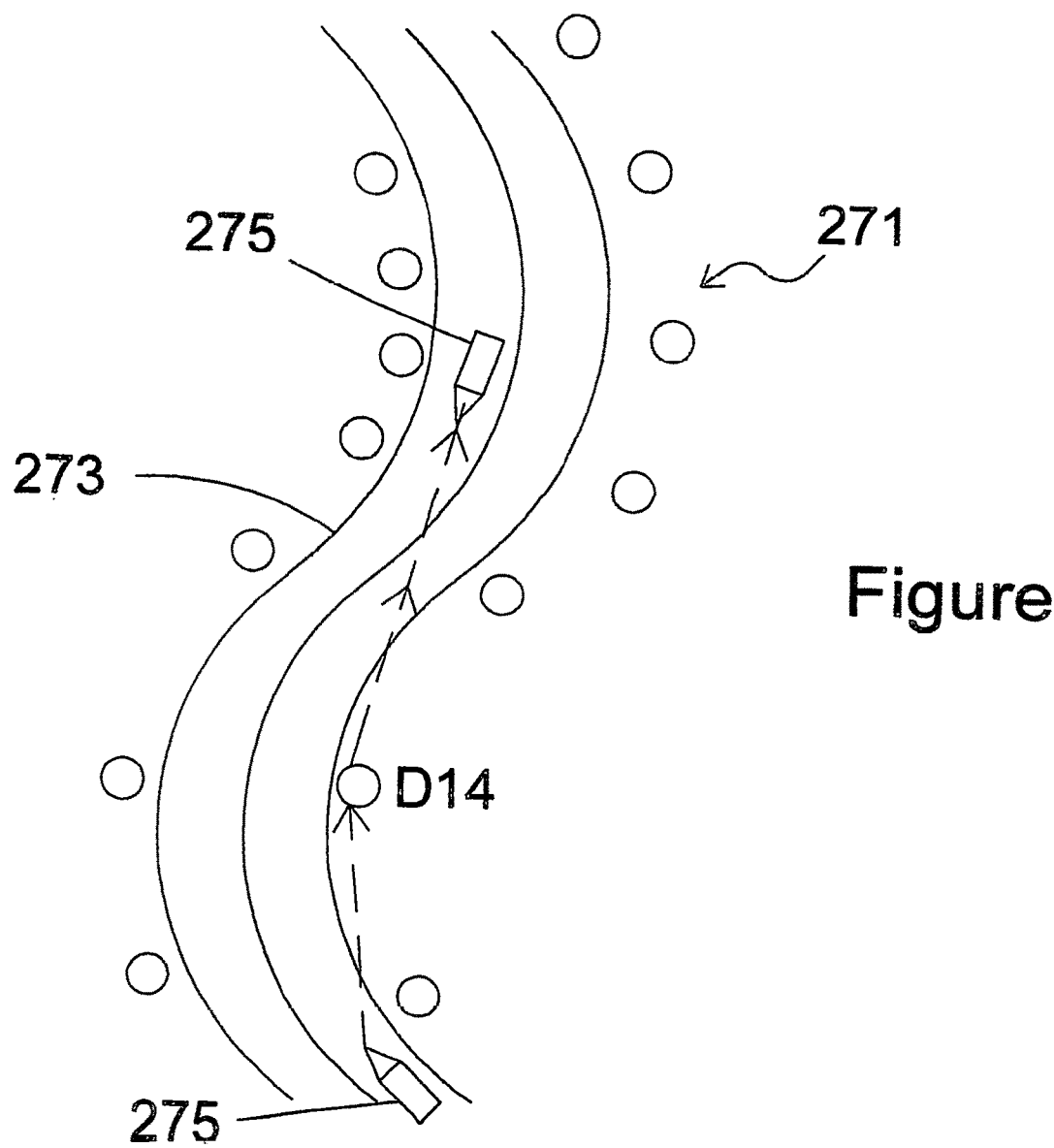

FIGS. 13 and 14 show top views of a system with different scenarios of opposing autonomous vehicles approaching one another with present invention optical fiber-based devices assisting in travel guidance. FIG. 13 shows a top view of one scenario around a sharp curve on road way 263 wherein vehicle 265 and vehicle 267 are approaching one another from opposite directions but cannot see each other. The road way 263 has present invention devices D1 through D9. Light emanating from vehicle 265 may be received by devices D3, D4 and D7 and that light will be directed back by optical fibers to vehicle 267 as a warning and as a supply of information to be relied upon for fine tuning lane positioning and collision avoidance. The present invention devices may specifically be any such present invention devices as contemplated by the descriptions herein, above and below. FIG. 14 shows a present invention system 271 with an S-shaped road way 273 and a plurality of present invention devices including one designated as D14. Light emanating from vehicle 275 traveling northward is received by device D14 and via optical fibers is directed to vehicle 277 traveling south toward vehicle 275. This information will be updated as the vehicles drive closer to each other in a sense that more transmitted light at closer angles will provide additional information for the guidance systems to be used for lane maintenance and collision avoidance. While FIG. 14 shows light coming from vehicle 275 that is received by vehicle 277, in general, the opposite will also occur. In other words, light will also emanate from vehicle 277 and be directed to vehicle 275 to provide additional data for guidance of autonomous vehicle 275. Additionally, FIG. 14 is simplified in that only one present invention device is shown receiving and transmitting light with the arrows showing one direction. In reality, multiple devices on side of the road at different or at the same time will be receiving light and directing light in one or both directions to further significantly fine tune each vehicles guidance toward and past one another. The left-most set of arrows in FIG. 13, thus, has arrowheads showing light paths traveling in both directions.

FIG. 15 shows front oblique view of a present invention installed device 300, with optical fiber-based device 301 with placement stand 303. The placement stand 303 may be any permanent or temporary stand, such as are used for permanent mile markers, signs and mailboxes, or temporary road signs (sometimes with a single pole but a criss-cross or extended leg base). Present invention reflector device 301 has 360 degrees surround rectangular lenses, such as lenses 305, 307 and 309 and, above its top 311 is a weather shield 313, and optical fibers inside that connect to and from these lenses. (These lenses may be combinations of any described above, and in semi-autonomous uses, the cautionary colors of red and orange are particularly beneficial). As can be seen, the rectangular shaped lenses take up almost all of the space, except for thin supports, and thus maximize use of incoming and return of outgoing light signals.

FIG. 16 shows a front view of a stacked arrangement 320 of present invention devices 321, 327 and 333. These have diverse shielding sections, particularly useful for four way, partially or fully obscured, intersections Device 321 has East and West shields, such as shield 323, with an array of lenses shown generally as lens area 325. Device 327 has East and West shields, such as shield 331, with an array of lenses, such as is shown generally as lens area 329. Device 333 has no shields and a full lens area 335, with weather shield 337 atop it. Optical fiber arrays, with or without mirror arrays, are contained within the device and function as described above.

Although particular embodiments of the invention have been described in detail herein with reference to the accompanying drawings, it is to be understood that the invention is not limited to those particular embodiments, and that various changes and modifications may be affected therein by one skilled in the art without departing from the scope or spirit of the invention as defined in the appended claims. For example, the actual shape of the main housing may be any of numerous possibilities as long as its functionality as described is not affected adversely. Also, as another example, the lenses may have identifying features such as binary number stenciling or template features, or barcodes, QR codes, reference numbers and/or letters, or any other identifying symbols. Further, the present invention devices may be stacked for the same or different functions, one level could be mirror reflectors and a second level could be optical fibers bundles' one level could have different directional settings as compared to a second level; a second level could be added to an existing level when a new stop light, school or hospital, for example, has been build to send a corresponding message, or when a parade is planned, or a construction warning. The possibilities are endless.

What is claimed is:

1. An autonomous vehicle optical fiber-based dual traffic controller device for detecting a second vehicle by a first vehicle, which comprises:
   a) a main support member, said main support member having at least a first side and a second side, said first side being opposite from said second side;
   b) an outer array, located on said main support member, said outer array having a plurality of light receiving, light transmitting lenses, said plurality of light receiving, light transmitting lenses being positioned, from a top view, in an arcuate arrangement having at least one focal point and said outer array having at least two of said plurality of light receiving, light transmitting lenses selected from said group consisting of colored lenses, clear lenses and combinations thereof;
   c) an inner array of light transmitting optical fibers positioned inside said outer array and directed toward and then away from a focal point of said at least one focal point of said outer array, each optical fiber of said inner array being positioned to receive light passing into said device through a lens of said plurality of light receiving, light transmitting lenses and to transmit said light out of said device through a lens of said plurality of light receiving, light transmitting lenses;
   wherein said outer array has at least two opposing lenses, wherein at least one of said at least two opposing lenses is on said first side of said main support member and at least one of said at least two opposing lenses is on said second side of said support member, such that they are opposite one another and, further are connected to one another by at least one of said light transmitting optical fibers.

2. The controller device of claim 1 wherein said arcuate arrangement of said outer array is selected from said group consisting of closed loop and a partial loop.

3. The controller device of claim 1 wherein from a top view, said arcuate arrangement of said outer array is selected from said group consisting of: arc of fixed radius, arc of varying radius, circle and polygon.

4. The controller device of claim 1 wherein said plurality of light receiving, light transmitting lenses include at least four lenses, each of said at least four lenses being in a different plane.

5. The controller device of claim 1 wherein said optical fibers are grouped in bundles connected from a first lens to a second lens of said plurality of light receiving, light transmitting lenses, and there are at least two bundles in said inner array, including a first bundle having optical fiber ends in a different plane from said other said optical fiber ends of a second bundle.

6. The controller device of claim 5 wherein said at least two bundles include four to twelve bundles, each having optical fiber ends in different planes.

7. The controller device of claim 1 wherein said light transmitting optical fibers include splits with at least one optical fiber having one single and one split end.

8. The controller device of claim 1 wherein said optical fibers are bundled and split with multiple split connected optical fibers ending at predetermined angles so as to split and transmit a single incoming light into multiple transmissions in different directions.

9. The controller device of claim 1 wherein from a top view, said arcuate arrangement of said outer array is circular and includes caution-colored lenses that are colored selected from said color group consisting of red, orange, yellow and combinations thereof.

10. An autonomous vehicle optical fiber-based dual traffic controller guidance system, which comprises:
- a) a plurality of autonomous vehicles having computers with lane guidance capability and having light receiving sensors connected to said computers, including a first autonomous vehicle and a second autonomous vehicle, each of said plurality of autonomous vehicles having a forward projecting light that includes vectors of light beams directed away from a lane of travel and light receiving sensors that recognize incoming light, including angle and distance, and including computer adjustment to lane positioning;
- b) a plurality of roadways having at least two lanes of travel, including a first lane for travel in a first direction and a second lane for travel in a second direction, said second direction being opposite said first direction, said roadways further including side areas outside of said first lane and said second lane;
- c) a plurality of autonomous vehicle dual traffic controller devices for aiding in detecting a second said autonomous vehicle by a first said autonomous vehicle, said plurality of autonomous vehicle dual traffic controller devices being located along said side areas of said plurality of roadways, wherein each of said plurality of autonomous vehicle dual traffic controller devices include:
  - i) a main support member, said main support member having at least a first side and a second side, said first side being opposite from said second side;
  - ii) an outer array, located on said main support member, said outer array having a plurality of light receiving, light transmitting lenses, said plurality of light receiving, light transmitting lenses being positioned, from a top view, in an arcuate arrangement having at least one focal point and said outer array having at least two of said plurality of light receiving, light transmitting lenses selected from said group consisting of colored lenses, clear lenses and combinations thereof;
  - iii) an inner array of light transmitting optical fibers positioned inside said outer array and directed toward and then away from a focal point of said at least one focal point of said outer array, each optical fiber of said inner array being positioned to receive light passing into said device through a lens of said plurality of light receiving, light transmitting lenses and to transmit said light out of said device through a lens of said plurality of light receiving, light transmitting lenses;

wherein said outer array has at least two opposing lenses, wherein at least one of said at least two opposing lenses is on said first side of said main support member and at least one of said at least two opposing lenses is on said second side of said support member, such that they are opposite one another and, further are connected to one another by at least one of said light transmitting optical fibers; and, wherein when said first autonomous vehicle and said second autonomous vehicle are traveling toward one another in opposite directions and a light beam from said first autonomous vehicle enters one of said plurality of autonomous vehicle dual traffic controller devices and reflects therein and is transmitted in as recognized light to said second autonomous vehicle, said light receiving sensor of said second autonomous vehicle relays angle and distance information to its said computer to make necessary lane adjustments to avoid vehicle collision.

11. The system of claim 10 wherein each of said plurality of autonomous vehicles include a computer that, at least in part, travels in conjunction with a satellite GPS guidance system in coordination with said autonomous vehicle dual traffic controller system.

12. The system of claim 11 wherein said plurality of autonomous vehicle dual traffic controller devices are located in a predetermined pattern.

13. The system of claim 10 wherein said arcuate arrangement is selected from said group consisting of closed loop and a partial loop.

14. The system of claim 10 wherein from a top view, said arcuate arrangement is selected from said group consisting of: arc of fixed radius, arc of varying radius, circle and polygon.

15. The system of claim 10 wherein said plurality of light receiving, light transmitting lenses include at least four lenses, each of said at least four lenses being in a different plane.

16. The system of claim 10 wherein said optical fibers are grouped in bundles connected from a first lens to a second lens of said plurality of light receiving, light transmitting lenses, and there are at least two bundles in said inner array, including a first bundle having optical fiber ends in a different plane from said other said optical fiber ends of a second bundle.

17. The system of claim 16 wherein said at least two bundles include four to twelve bundles, each having optical fiber ends in different planes.

18. The system of claim 10 wherein said light transmitting optical fibers include splitters with multiple optical fibers connected to a single optical fiber.

19. The system of claim 10 wherein said optical fibers are bundled and split with multiple split connected optical fibers ending at predetermined angles so as to split and transmit a single incoming light into multiple transmissions in different directions.

20. The system of claim 10 wherein from a top view, said arcuate arrangement of said outer array is circular and includes caution-colored lenses that are colored selected from said color group consisting of red, orange, yellow and combinations thereof.

* * * * *